United States Patent
Breynaert et al.

(10) Patent No.: US 7,170,208 B2
(45) Date of Patent: *Jan. 30, 2007

(54) CONNECTOR WITH FLUX CONCENTRATOR FOR ELECTRIC MOTOR

(75) Inventors: Francois Breynaert, Caen (FR); Herve Laurandel, Herouville Saint Clair (FR); Jerome Quere, Bieville Beuville (FR); Didier Senecal, Langrune/Mer (FR)

(73) Assignee: ArvinMeritor Light Vehicle Systems-France, Sully-sur-Loire (FR)

( * ) Notice: Subject to any disclaimer, the term of this patent is extended or adjusted under 35 U.S.C. 154(b) by 0 days.

This patent is subject to a terminal disclaimer.

(21) Appl. No.: 11/264,987

(22) Filed: Nov. 2, 2005

(65) Prior Publication Data

US 2006/0113860 A1      Jun. 1, 2006

Related U.S. Application Data

(62) Division of application No. 10/257,729, filed on Jun. 24, 2003, now Pat. No. 6,998,741.

(30) Foreign Application Priority Data

Apr. 14, 2000 (FR) .................................. 00 04870
Apr. 13, 2001 (EP) .................... PCT/EP01/04333

(51) Int. Cl.
*H02K 7/09* (2006.01)
*H02K 11/00* (2006.01)
*H02K 29/08* (2006.01)

(52) U.S. Cl. ...................... 310/68 B; 310/71

(58) Field of Classification Search .............. 310/68 B, 310/71, 239; 324/207.25, 207.2
See application file for complete search history.

(56) References Cited

U.S. PATENT DOCUMENTS

| | | | | |
|---|---|---|---|---|
| 4,587,509 | A | * | 5/1986 | Pitt et al. ................... 338/32 H |
| 4,774,430 | A | * | 9/1988 | Rodriguez et al. .......... 310/239 |
| 5,164,668 | A | * | 11/1992 | Alfors ..................... 324/207.2 |
| 5,469,053 | A | * | 11/1995 | Laughlin ............... 324/207.18 |
| 6,043,576 | A | * | 3/2000 | Weber et al. .............. 310/68 B |
| 6,107,713 | A | * | 8/2000 | Hulsmann et al. ........ 310/75 R |
| 6,707,183 | B2 | * | 3/2004 | Breynaert et al. ........ 310/68 B |
| 2002/0016087 | A1 | * | 2/2002 | Breynaert et al. ............ 439/38 |
| 2004/0021379 | A1 | * | 2/2004 | Breynaert et al. ........ 310/68 B |

FOREIGN PATENT DOCUMENTS

| | | | |
|---|---|---|---|
| DE | 42 18 793 | * | 12/1993 |
| GB | 2153612 | * | 8/1985 |
| WO | 98/27640 | * | 6/1998 |
| WO | 98/35427 | * | 8/1998 |
| WO | 99/13341 | * | 3/1999 |

* cited by examiner

*Primary Examiner*—Karl Tamai
(74) *Attorney, Agent, or Firm*—Carlson, Gaskey & Olds

(57) ABSTRACT

A connector for an electric motor including a magnetic ring which is the seat of a magnetic field tied to operating parameters of the motor. A magnetic flux conduction member forms a flux concentrator interposed, when a connector is fixed on the motor, between the magnetic ring and a Hall-effect sensor to measure the magnetic flux conducted by the magnetic flux conduction member. The electric motor can be used with geared motors for window-lifting systems, seat actuation systems or sunroof systems in the automobile field.

8 Claims, 4 Drawing Sheets

CONNECTOR WITH FLUX CONCENTRATOR FOR ELECTRIC MOTOR

REFERENCE TO RELATED APPLICATIONS

This application is a Divisional patent application of U.S. patent application Ser. No. 10/257,729 filed Jun. 24, 2003 now U.S. Pat. No. 6,998,741, which claims priority to PCT Application PCT/EP01/04333 filed on Apr. 13, 2001, which claims priority to French Patent Application No. FR 00 04 870 filed on Apr. 14, 2000.

BACKGROUND OF THE INVENTION

The present invention relates to the field of electric motors, in particular geared motors for automobile accessories, which are used for example in window-lifting systems, seat actuation systems or sunroof systems.

The invention is more precisely aimed at a connector for an electric motor, said motor comprising a magnetic ring which is the seat of a magnetic field tied to operating parameters of the motor.

The motors or geared motors to which the invention applies are associated with a control system which uses motor speed and/or position parameters. These parameters are fed to the control system by a Hall-effect sensor associated with the magnetic ring, which is adapted so as to deliver to the sensor a magnetic field dependent on the speed and/or position of the motor shaft.

Generally, the electronic control devices of such motors or geared motors comprise a circuit board secured to the casing of the motor, said board comprising motor electrical supply connections and the Hall-effect sensor. This sensor is fixed on a board part formed of a rigid strip that penetrates into the casing of the motor up to a region neighboring the magnetic ring, in such a way that the sensor is located in the vicinity of said ring.

It can readily be seen that the presence of such an electronic control module on the casing of the motor is incompatible with a high degree of standardization of motors, since such a configuration of the motor and of its casing is not suited to an application in which the speed and/or position sensor is dispensed with, and in which the electronic control device of the motor is located remotely some distance away from the motor.

SUMMARY OF THE INVENTION

A main aim of the invention is to remedy this drawback, and to propose a connector for an electric motor, which makes it possible to transport information of magnetic type to an electronic processing device and is capable of amalgamating with this function the conventional functions for the electrical supply of the motor.

With this aim, a connector according to the invention comprises at least one magnetic flux conduction member forming a flux concentrator interposed, when the connector is fixed on the motor, between the magnetic ring and a Hall-effect sensor adapted so as to measure the magnetic flux conducted by the magnetic flux conduction member.

According to one embodiment, the magnetic flux conduction member exhibits an elongate part, an end of the elongate part exhibiting a smaller section than the mean section of the elongate part, neighboring the Hall-effect sensor.

According to a further embodiment, the section of said end decreases progressively in the neighborhood of the Hall-effect sensor.

According to a further embodiment, the elongate part of the magnetic flux conduction member is made of soft steel.

According to other characteristics of the invention:
the magnetic flux conduction member comprises at least one metal pin adapted so that a part of said pin, when the connector is fixed on the motor, lies in the vicinity of the magnetic ring;
the magnetic flux conduction member comprises two metal pins whose free ends are disposed symmetrically with respect to an axial plane (P) of the magnetic ring;
the connector furthermore comprises at least two electrical power contacts linked to a supply source for the motor;
the electrical contacts comprise a part made of brass;
at least one of said electrical power contacts is disposed so as to constitute a part of the magnetic flux conduction member;
said power contact constituting a part of the magnetic flux conduction member is connected, when the connector is fixed on the motor, to a metal pad secured to the motor and a part of which lies in the vicinity of the magnetic ring;
said power contact constituting a part of the magnetic flux conduction member is made of steel;
the magnetic flux conduction member is secured to the power contact;
the magnetic flux conduction member is affixed to the power contact;
the connector is secured to a printed circuit on which the Hall-effect sensor is disposed;
the connector is adapted so as to be fixed in a detachable manner on the electric motor.

The invention is also aimed at a geared motor for automobile accessories, such as a window or a seat, comprising a rotor shaft equipped with a magnetic ring, characterized in that it comprises a connector as described above.

BRIEF DESCRIPTION OF THE DRAWINGS

Exemplary embodiments of the invention will now be described with regard to the appended drawings, in which.

DETAILED DESCRIPTION OF THE PREFERRED EMBODIMENT

Figure 1:
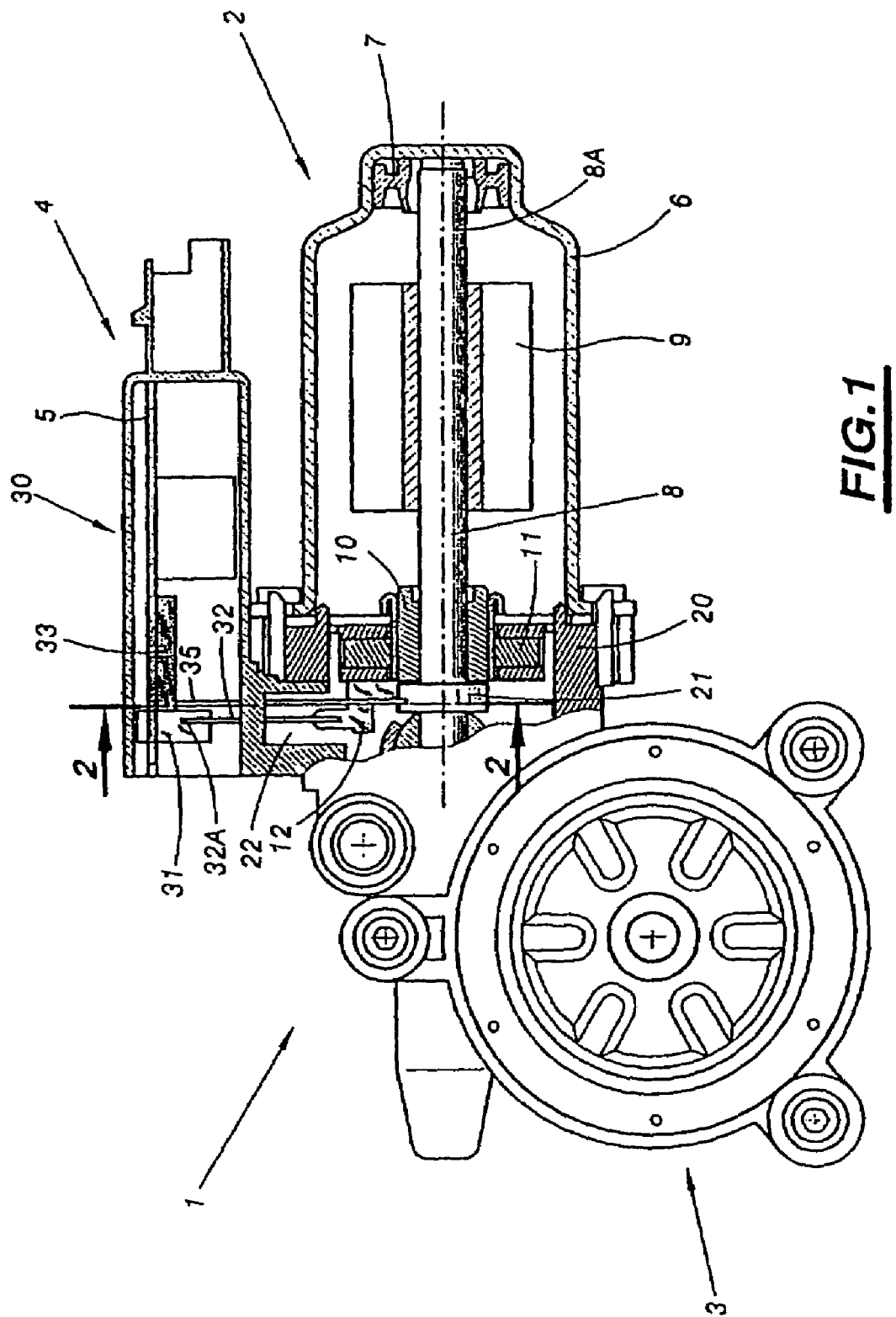
FIG. 1 is an end-on view in partial section of a geared motor equipped with a connector according to a first embodiment of the invention.

Represented in FIG. 1 is a geared motor 1 including a motor 2 and a reduction gear 3, the motor 2 being equipped with an electronic control device 4 which includes a printed circuit board 5.

The motor 2 includes a stator 6 forming a shroud in which permanent magnets (not represented) are housed and supporting by way of a bearing 7 an end 8A of a rotor shaft 8 of a rotor 9. In a known manner, the latter includes windings coiled around stacked laminations. A commutator 10 is linked electrically to the rotor 9 and receives by way of brushes 11 the motor supply current transmitted to the motor 2 at the level of supply lugs 12.

The geared motor 1 further includes a casing 20 rigidly fixed to the stator 6 and supporting by way of a second bearing assembly, not represented, a second end of the rotor shaft 8. The rotor shaft 8 span situated on the same side as the second shaft end is configured as a threaded rod forming a worm screw, which drives a set of gears of the reduction gear 3. A magnetic ring 21 is fixed on the rotor shaft 8 in a region neighboring the supply lugs 12.

The casing 20 exhibits an aperture 22 near the supply lugs 12 that receives in a detachable manner an electrical connector 30 into which the printed circuit board 5 of the electronic control device 4 is fixed. The printed circuit board 5 supports an electronic circuit able to deliver a supply current for the motor 2. The connector 30 is held in position by a releasable fastener of conventional type (not illustrated). The current delivered by the electronic circuit travels through power tags 31 secured to the printed circuit board 5, each of the power tags 31 being connected fixedly to an end 32A of a contact 32 of a "stirrup" type, that is one end of the power contact 32 includes an elastic clip having two inwardly arched symmetric contact portions.

The printed circuit board 5 additionally supports a Hall-effect sensor 33 intended to receive a magnetic flux indicative of the speed and/or position of the rotor shaft 8 and to transmit to the electronic control device 4 an electrical signal indicative of these operating parameters of the motor 2.

The connector 30 also includes a magnetic flux conduction member including, in the embodiment of the invention represented in FIG. 1, of two parallel metal pins 35, one end of which is fixed to the printed circuit board 5 in the vicinity of the Hall-effect sensor 33. The other end 35A constituting the free end of the pin 35 is situated, when the connector 30 is inserted into the aperture 22 of the corresponding casing 20 and held by the fastener, near a periphery of the magnetic ring 21. The two free ends 35A are preferably disposed symmetrically with respect to an axial plane P of the magnetic ring 21.

Figure 2:
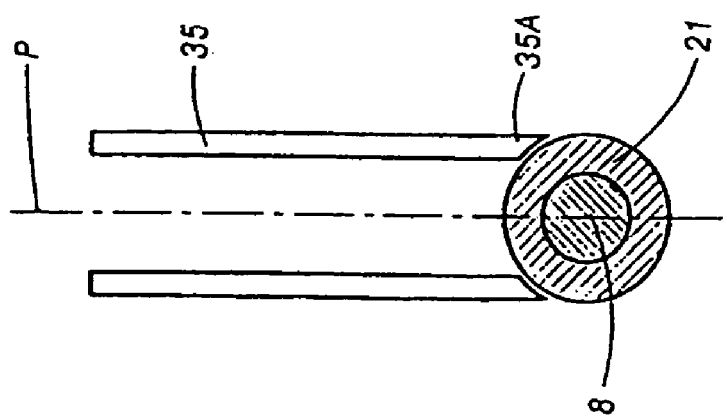
FIG. 2 is a diagrammatic cross section along the line 2—2 of FIG. 1 representing the magnetic flux conduction member and the magnetic ring.

The relative position of the metal pins 35 and of the magnetic ring 21 is more clearly apparent in FIG. 2. The magnetic ring 21 generates a magnetic field of constant strength whose direction varies with the angular position of the rotor shaft 8, and therefore the magnetic flux conducted by the pins 35 of the magnetic ring 21 to the Hall-effect sensor 33 is dependent on an angular position of the rotor shaft 8. The electrical signal delivered by the Hall-effect sensor 33 therefore affords access to the speed and/or angular position of the rotor shaft 8. Preferably, the pins 35 forming magnetic flux conduction members are made of steel.

Figure 3:
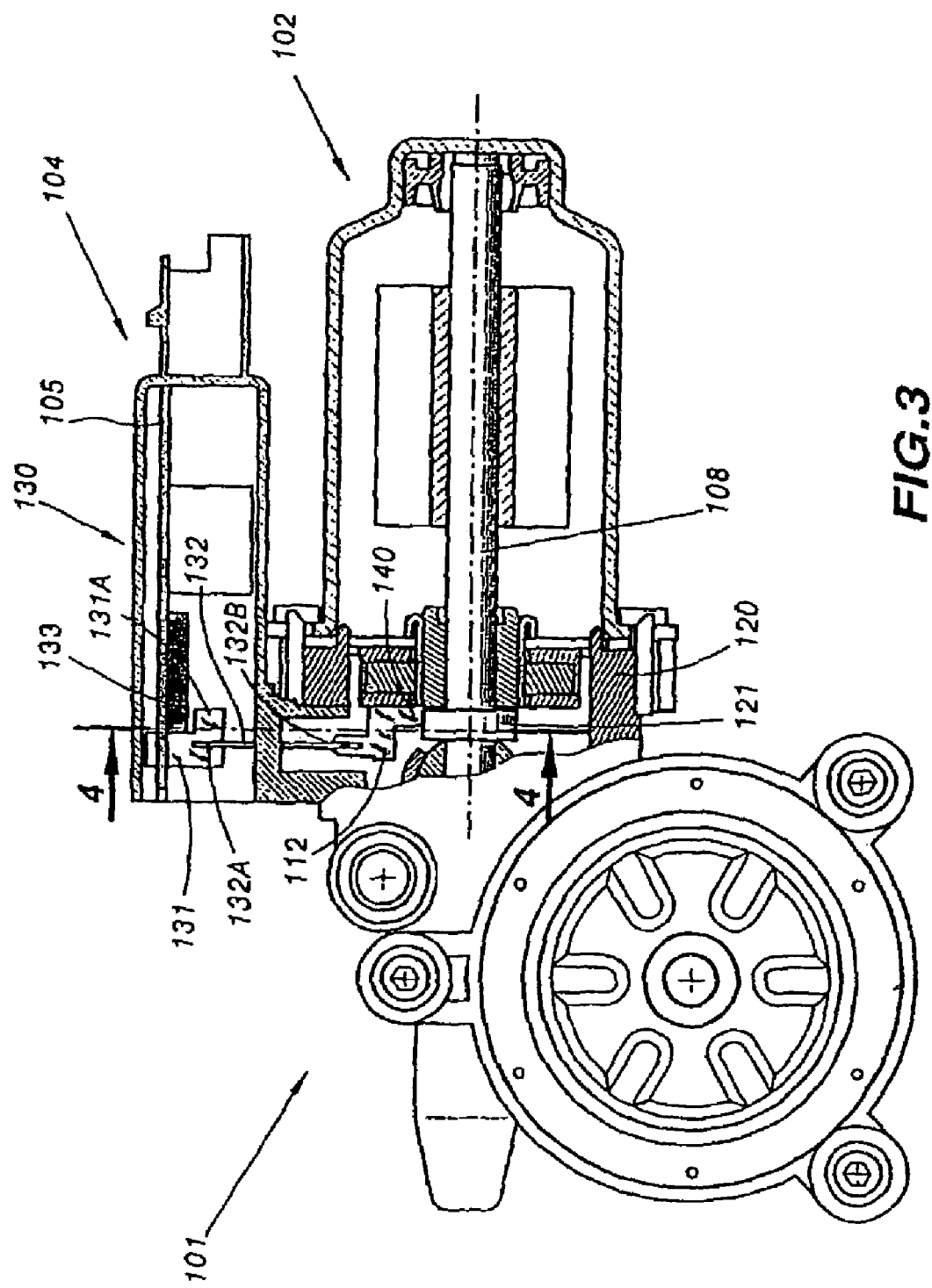
FIG. 3 is a view similar to FIG. 1 according to a second embodiment of the invention.

Represented in FIG. 3 is a geared motor 101 of the same type as above, whose motor 102 includes a rotor shaft 108 on which a magnetic ring 121 is fixedly mounted. A connector 130 includes a printed circuit board 105 forming part of an electronic control device 104 of the electric motor 102 and supporting a pair of supply tags 131 situated in proximity to a Hall-effect sensor 133. The connector 130 is fixed in a detachable manner to the casing 120 of the geared motor 101 by conventional releasable fastener (not represented). The connector 130 includes contacts 132 of "stirrup" type, fixed by one of their ends 132A to the supply tags 131 and intended to be connected by a second end 132B to motor supply lugs 112.

Figure 4:
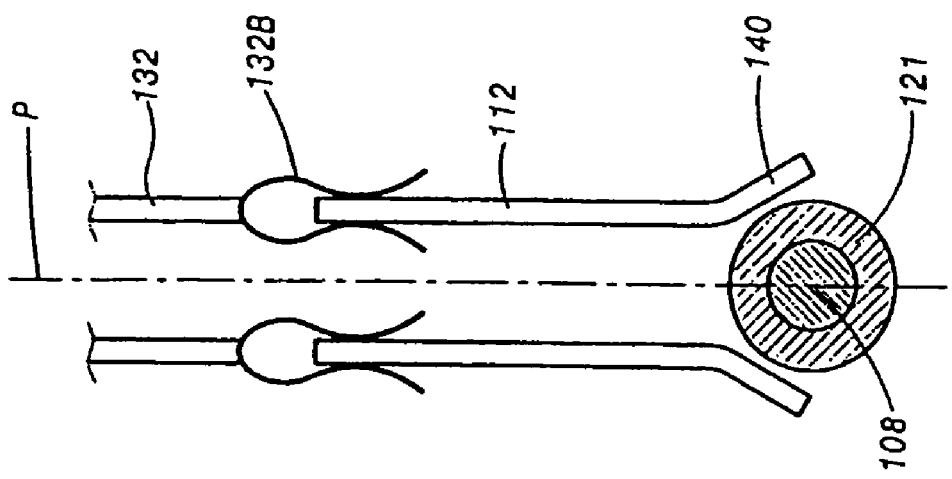
FIG. 4 is a cross section similar to FIG. 2, along the line 4—4 of FIG. 3.

In this embodiment of the invention, and as will be more clearly seen in FIG. 4, the two lugs 112 each exhibit a part 140 overlapping the magnetic ring 121 oblique with respect to the direction of coupling of the contacts 132, and which lies in the vicinity of the magnetic ring 121 in an almost tangential manner. The two parts 140 are preferably symmetric with respect to the axial plane P of the magnetic ring 121. Likewise, the supply tags 131 include a part 131A partially overlapping the Hall-effect sensor 133, so that the lugs 112, the contacts 132 and the supply tags 131 fulfil the flux concentrator function and constitute a member for conducting the magnetic flux of the magnetic ring 121 to the Hall-effect sensor 133.

Preferably, the contacts 132 are made of steel, a material of this type offering an acceptable compromise between the qualities of electrical and magnetic conduction, and exhibiting excellent mechanical properties.

It is readily understood that the two embodiments of the invention which have just been described make it possible to design geared motors with a high degree of standardization. Specifically, it is not necessary to secure a printed circuit board carrying a Hall-effect sensor to the motor in order to achieve the position and/or speed sensor functions, and hence to modify the casing of a standard motor. Thus, one and the same motor can be used regardless of the application of the geared motor, and regardless of the type of sensor required (speed/position), only the connector having to be modified.

Figure 5:
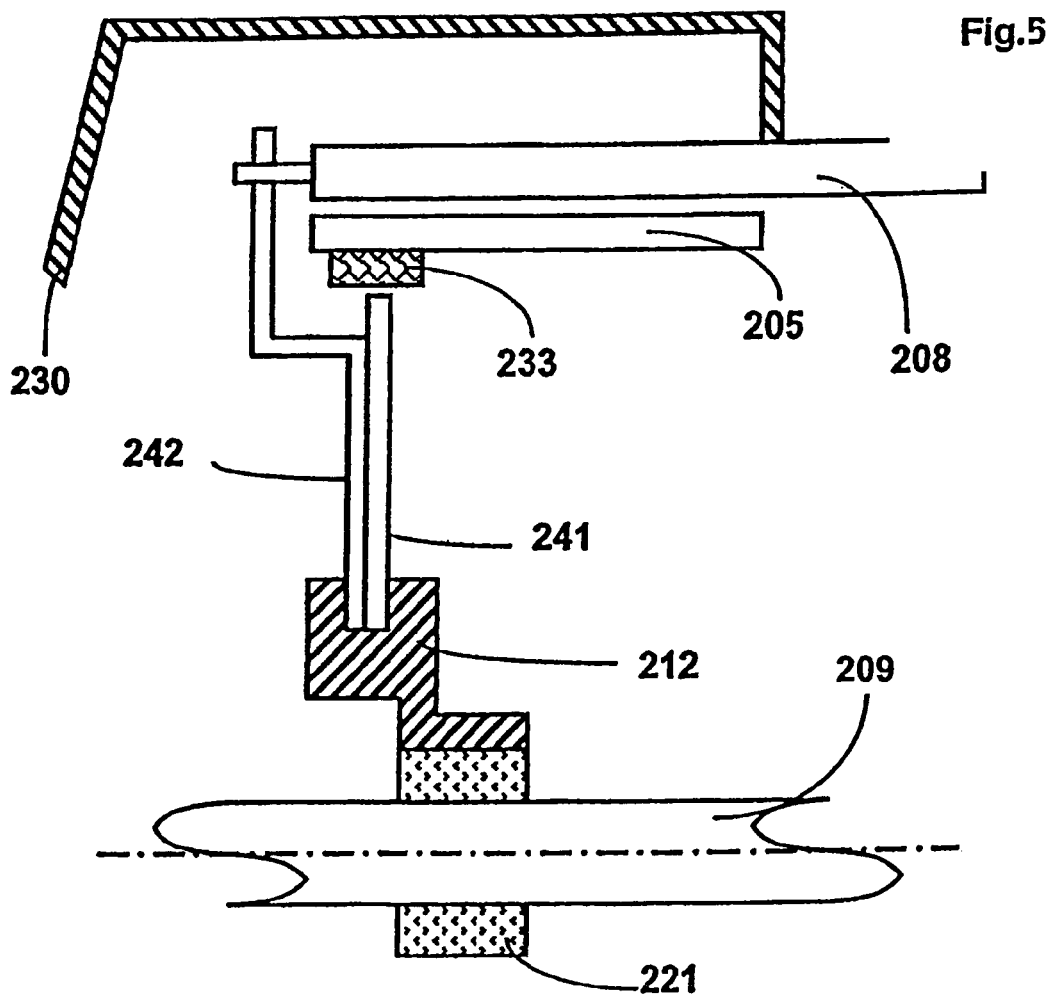
FIG. 5 is a partial sectional end-on view of a third embodiment of the invention.
Figure 6:
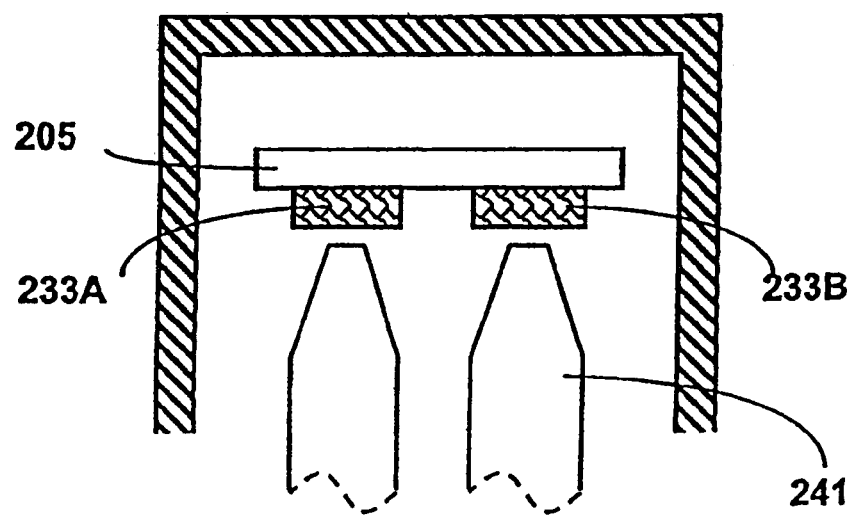
FIG. 6 is a sectional diagrammatic side view of the embodiment of FIG. 5.

FIGS. 5 and 6 represent a geared motor according to a third embodiment of the invention. A connector 230, represented only partially, includes, as in the other 5 embodiments, a printed circuit board 205 that supports a Hall-effect sensor 233.

Magnetic flux conduction pins 241 each exhibit an end near a Hall-effect sensor part 233A and 233B, respectively. The other end of the pins 241 can, for example, come into contact with a respective lug 212. As in the embodiment of FIG. 3, the lugs 212 supplies the magnetic ring 221 mounted on a rotor 209. The magnetic flux of the magnetic ring 221 can thus be conducted from the magnetic ring 221 up to the Hall-effect sensor 233.

As represented in FIG. 6, the magnetic flux conduction pins 241 exhibit an elongate part. This elongate part exhibits an end neighboring the sensor 233 of reduced section, that is to say of smaller section than the mean section of the elongate part. This reduced section can for example be obtained by using flat pins of reduced width at the level of this end. The reduced section makes it possible to concentrate the magnetic flux at the level of the Hall-effect sensor 233. The amplitude of the magnetic flux conducted by the pins 241 up to the Hall-effect sensor 233 is thus increased. Similar pins of reduced section may of course be used in the previous embodiments of the invention.

Pins whose section decreases progressively toward the Hall-effect probe are preferably used. The flux losses in proximity to the Hall-effect probe are thus reduced. The pins 241 are preferably made of soft iron, steel, nickel or ferrite. A material exhibiting high magnetic permeability is generally used.

According to a variant, supply tags 242 electrically link an electrical supply harness 208 to the lugs 212. The supply tags 242 are preferably made of copper or brass so as to ensure high conduction of the electric current between the supply harness 208 and the lugs 212.

The supply tags 242 and the pins 241 can be fixed at the same level as the lugs 212. Each supply tag 242 can also be fitted to a pin, for example by soldering, by adhesive bonding or by riveting. It is also possible to use other means of mechanical fixing or simply to stack a tag on top of a pin, retaining them by their respective ends.

The invention, which makes it possible to conduct magnetic information to a remote sensor, renders a single geared motor configuration adaptable to various applications, the standardization of the geared motor being offset by the diversification of the connection engineering, thereby achieving a considerable saving with regard to the complete system.

The invention claimed is:

1. A geared motor for an automobile accessory, the geared motor comprising:
    an electric motor;
    a rotor shaft having a magnetic ring, wherein the rotor shaft is driven by the electric motor;
    a reduction gear driven by the rotor shaft;
    a casing that houses the reduction gear;
    a lug secured to the electric motor; and
    a connector detachably connected to the casing, wherein the casing is maintained permanently assembled to the electric motor, the connector including:
    a sensor,
    a magnetic flux conduction member forming a flux concentrator between the magnetic ring and the sensor when the connector is connected to the electric motor, wherein the sensor measures magnetic flux conducted by the magnetic flux conduction member, and the magnetic flux conduction member includes at least one longitudinal member neighboring the sensor, and
    at least two electrical contacts linked to a supply source for the electric motor, wherein the at least two electrical contacts and the lug are separate components that are connected together when the connector is fixed to the electric motor.

2. The geared motor of claim 1, wherein the at least one longitudinal member is made of steel.

3. The geared motor of claim 1, wherein the at least two electrical contacts are made of brass.

4. The geared motor of claim 1, wherein the connector and the sensor are both disposed on a printed circuit board.

5. The geared motor of claim 1, wherein the sensor is a Hall effect sensor.

6. The geared motor of claim 1, wherein a cross sectional area of the at least one longitudinal member decreases progressively near the sensor.

7. The geared motor of claim 1, wherein the magnetic flux conduction member comprises two metal pins, each of the two metal pins including a free end that is disposed symmetrically with respect to an axial plane of the magnetic ring, and the free end of each of the two metal pins is near the magnetic ring when the connector is fixed to the electric motor.

8. The geared motor of claim 1, wherein the connector is detachably fixed to the electric motor.

* * * * *